(No Model.)  
7 Sheets—Sheet 2.
J. G. MARTIN.
BINDER ATTACHMENT FOR SELF BINDING HARVESTERS.
No. 466,528.  
Patented Jan. 5, 1892.
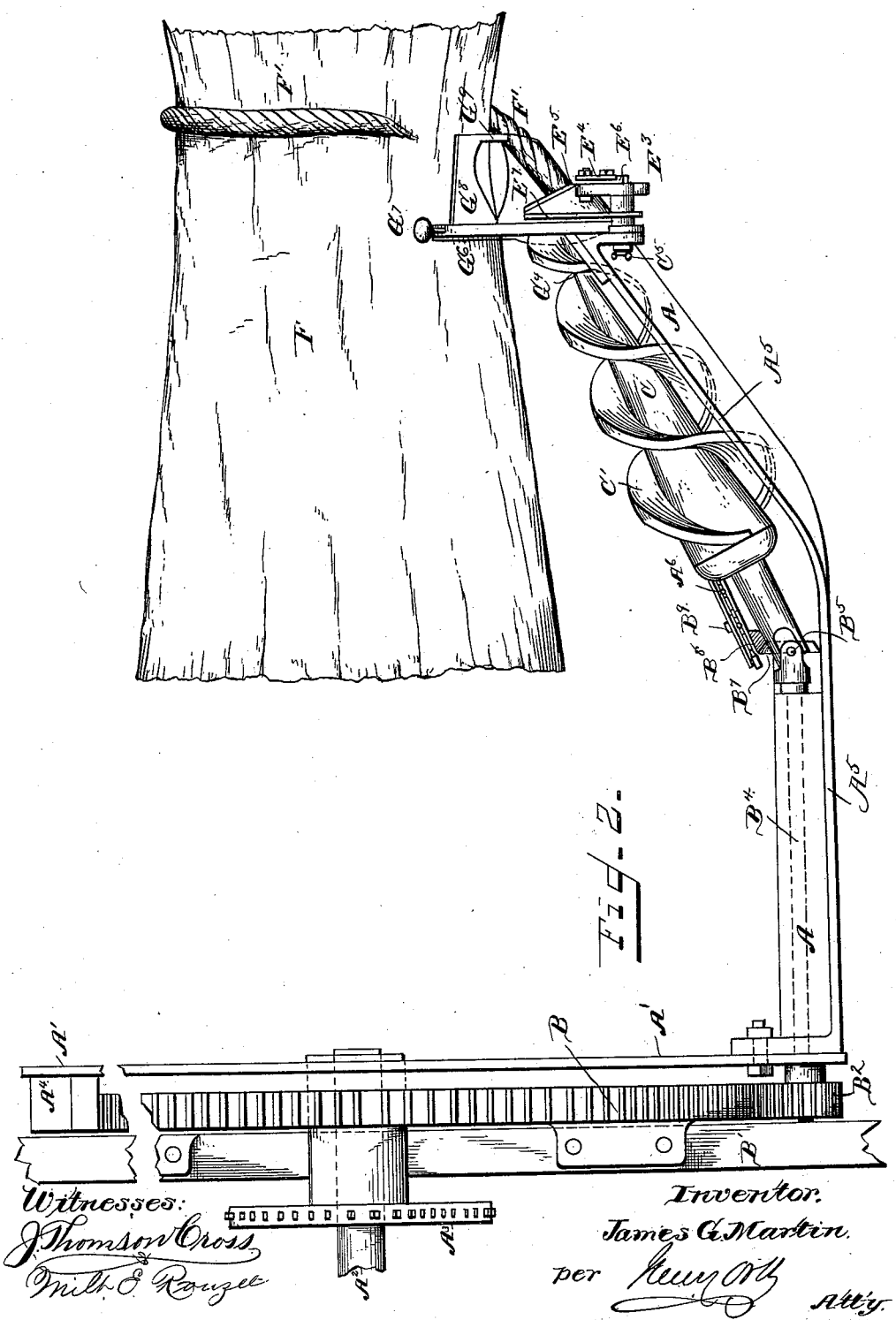
Witnesses:  
J. Thomson Cross  
Milt. E. Rouzer
Inventor.  
James G. Martin.  
per Henry Orth  
Att'y.

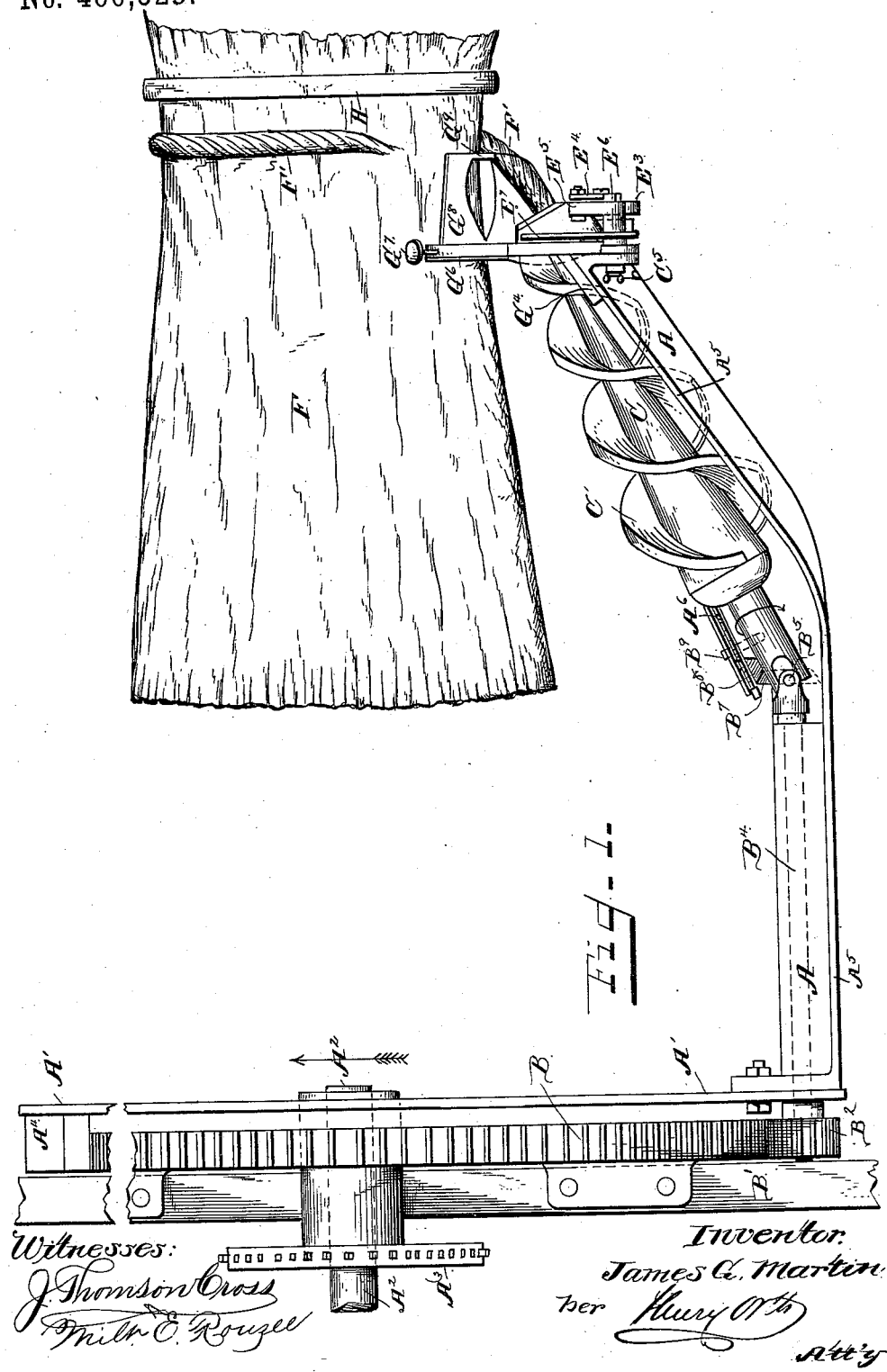

(No Model.) 7 Sheets—Sheet 3.
J. G. MARTIN.
BINDER ATTACHMENT FOR SELF BINDING HARVESTERS.
No. 466,528. Patented Jan. 5, 1892.
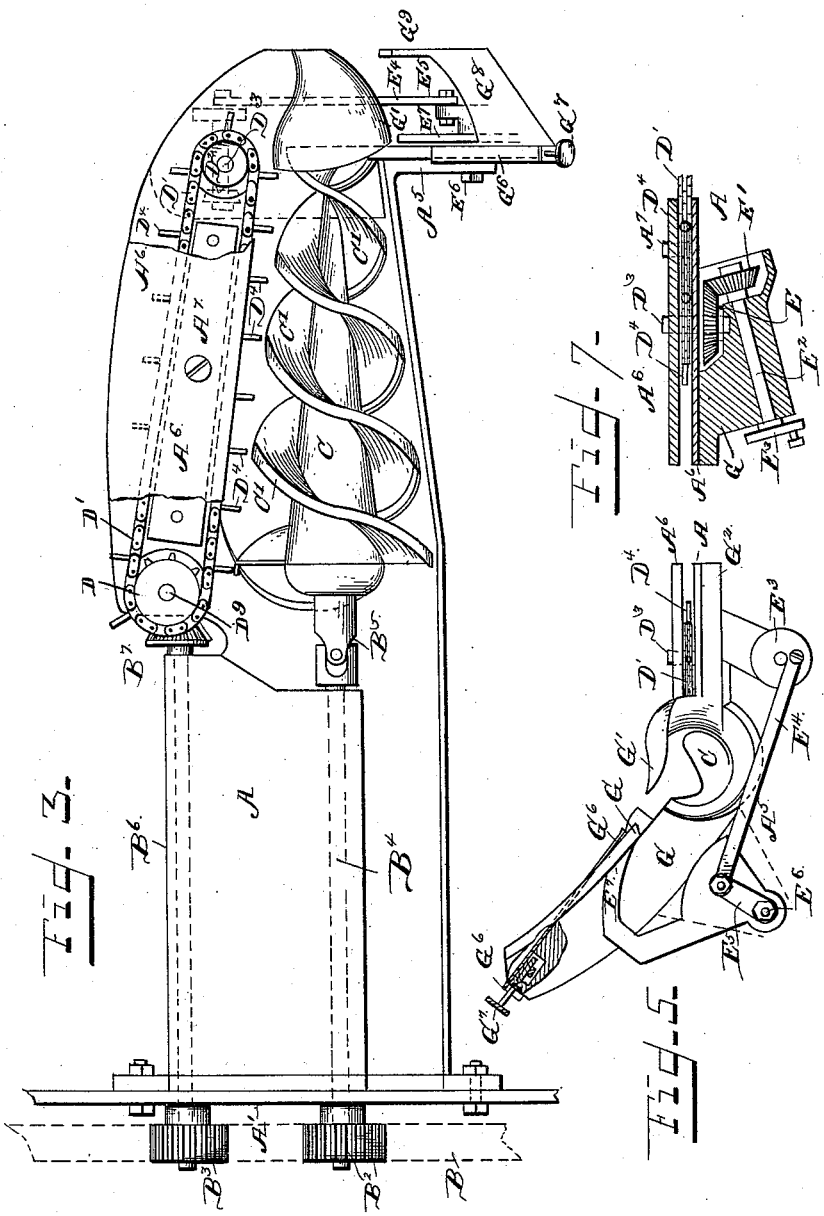

(No Model.) 7 Sheets—Sheet 4.
J. G. MARTIN.
BINDER ATTACHMENT FOR SELF BINDING HARVESTERS.
No. 466,528. Patented Jan. 5, 1892.
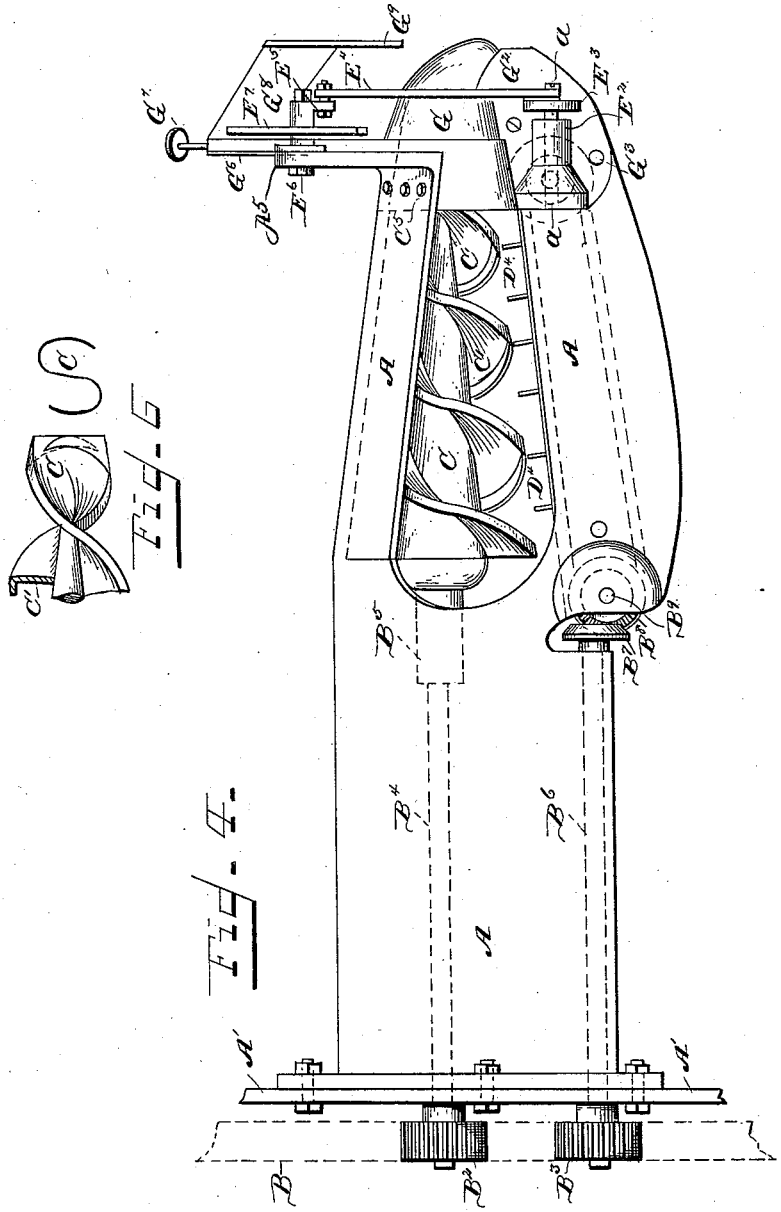

(No Model.) 7 Sheets—Sheet 5.
J. G. MARTIN.
BINDER ATTACHMENT FOR SELF BINDING HARVESTERS.
No. 466,528. Patented Jan. 5, 1892.
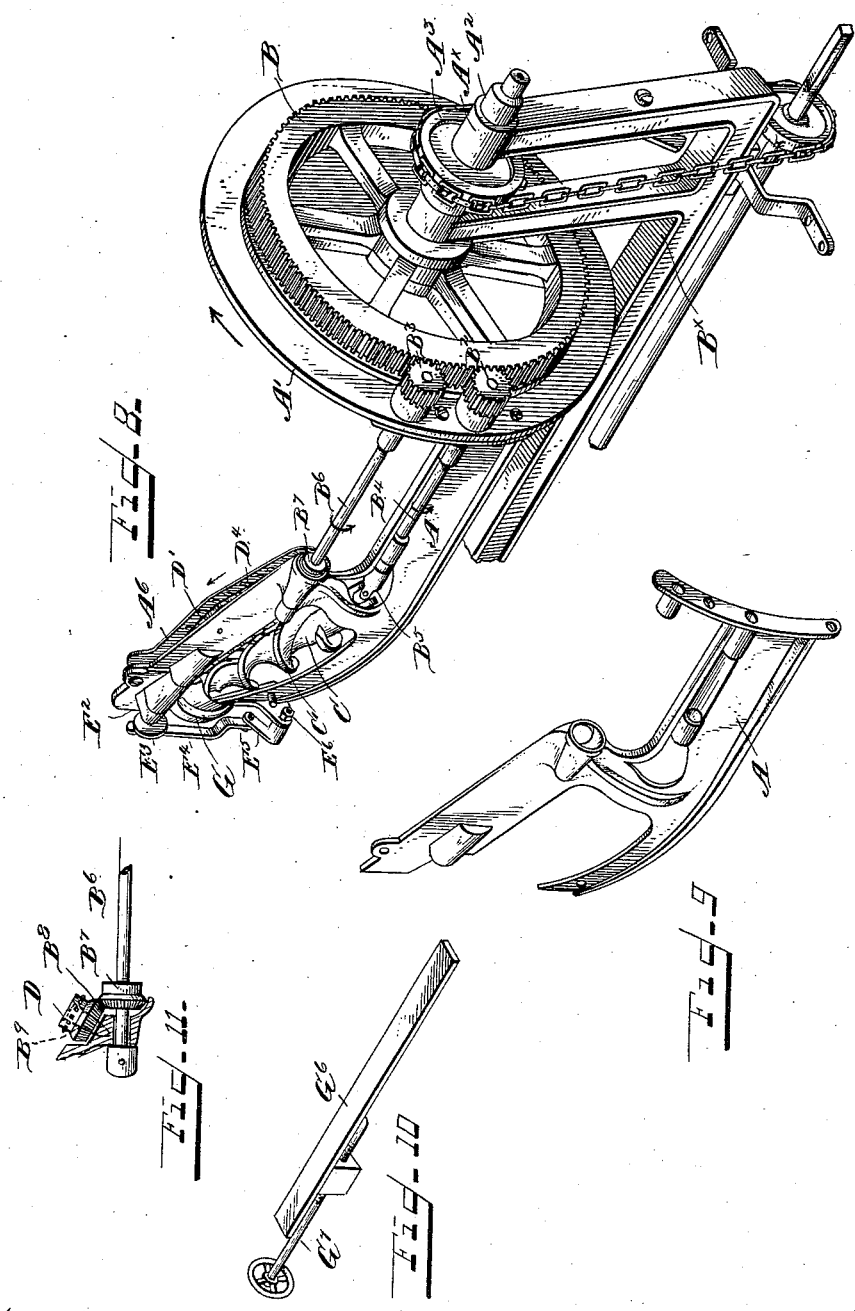

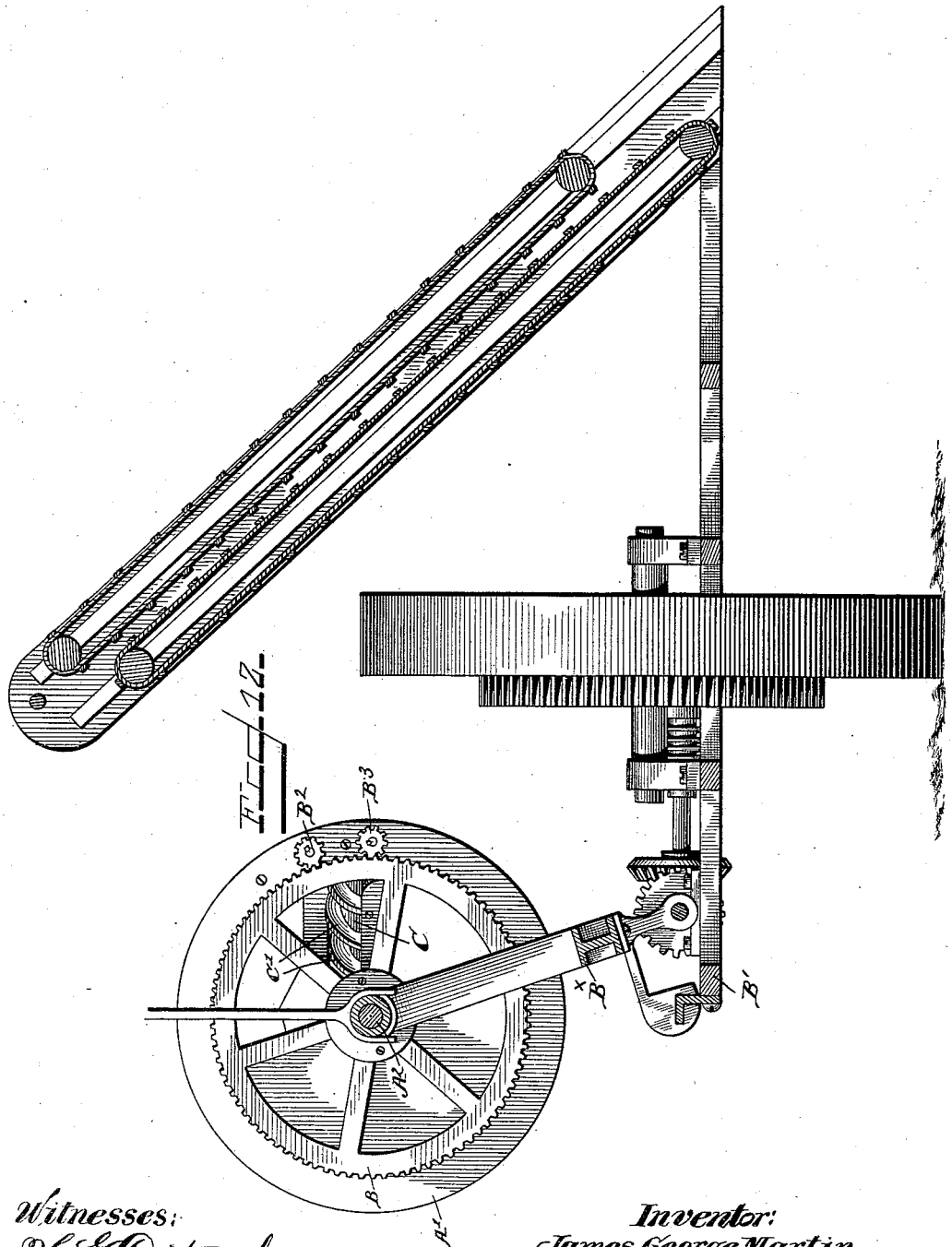

(No Model.) 7 Sheets—Sheet 7.
J. G. MARTIN.
BINDER ATTACHMENT FOR SELF BINDING HARVESTERS.
No. 466,528. Patented Jan. 5, 1892.
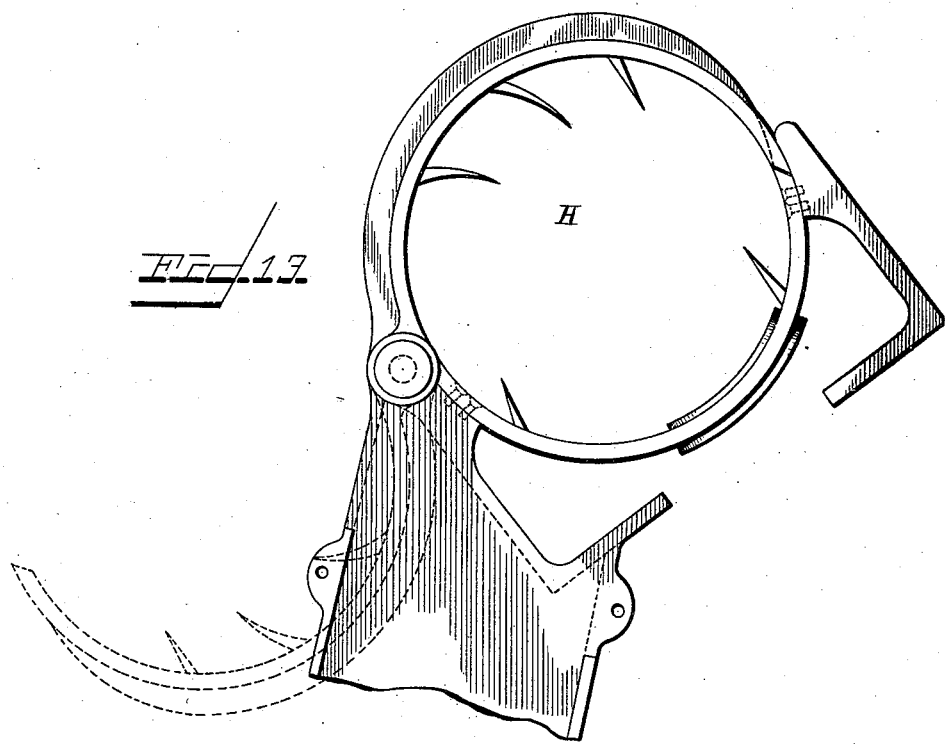

UNITED STATES PATENT OFFICE.

JAMES GEORGE MARTIN, OF PARKVILLE, NEAR MELBOURNE, VICTORIA.

BINDER ATTACHMENT FOR SELF-BINDING HARVESTERS.

SPECIFICATION forming part of Letters Patent No. 466,528, dated January 5, 1892.

Application filed January 31, 1888. Serial No. 262,578. (No model.) Patented in Canada March 2, 1888, No. 28,603, and March 22, 1889, No. 30,991, and in England May 18, 1888, No. 7,405.

*To all whom it may concern:*

Be it known that I, JAMES GEORGE MARTIN, engineer, a subject of the Queen of Great Britain, residing at Castlemilk House, Benjamin Street, Parkville, near Melbourne, in the British Colony of Victoria, have invented Improvements in Binder Attachments for Sheaf-Binding Harvesters, (for which Letters Patent have been granted to me in Canada, dated March 2, 1888, No. 28,603, and March 22, 1889, No. 30,991, and in England May 18, 1888, No. 7,405,) of which the following is a specification.

My invention relates to that class of grain-binders in which the material forming the band is taken from the bundle being bound.

My invention consists in distinct drawing, feeding, and twisting devices, which draw the straw butts in a continuous stream from the periphery of the bundle, feed the same to be twisted, and twist them into a band while traveling around the bundle, in combination with means for holding the bundle stationary, and to certain details in the construction and arrangement of parts, all as hereinafter explained.

In the accompanying drawings, Figure 1 is a plan or top view of so much of the binder-frame as is necessary for an understanding of my improved process, showing the means for clamping and holding the bundle, showing a portion of the bundle, also the binding attachment and its supporting-arm which carries it around the sheaf, and showing also the devices for supporting and imparting motion to the mechanism on such arm. Fig. 2 is a similar view showing the band-clamping devices removed. Fig. 3 is a face or inside view, looking from the bundle or receiving side, showing the worm for forming the band, the rake for carrying the butts thereto, and a plan view of the feeding-finger. Fig. 4 is a face view of the parts shown in Fig. 3, taken from the opposite side. Fig. 5 is an end view showing the hook for taking the straw from the bundle, also the feeding-finger and the means for operating the same, and also the devices for regulating the quantity of straw to be taken by the hook. Fig. 6 is a side and an end view of the worm. Fig. 7 is a sectional view taken on the line $a\,a$, Fig. 4, showing the bevel-pinion for communicating motion from the rake-shaft to the feeding-finger and the rod and crank for connecting the same. Fig. 8 is a perspective view of the binding devices, taken from the front stubble-corner of the machine. Fig. 9 is a perspective view of the supporting arm or bracket stripped of all its parts. Fig. 10 is a perspective view of the sliding plate and adjusting-screw for regulating the amount of straw to be taken to form the band. Fig. 11 is a top plan view of the gearing for driving the front end of the pitch-chain. Fig. 12 is a view of the frame adjacent to the master-wheel, showing the elevating belt or carriers in section and the position of the band-forming mechanism. Fig. 13 is a view of the bundle-holder.

$B'$ represents the front sill of the machine, and upon which is mounted a supporting-frame $B^\times$, which frame at its upper end has connected to it an enlarged gear-wheel B.

Upon a shaft $A^2$, passing through the center of the gear and revolving in bearings $A^\times$ in the frame $B^\times$, is mounted a carrying disk or plate $A'$, and upon the opposite end of this shaft $A^2$ is also mounted a sprocket-wheel $A^3$, to which an intermittent revolving motion is imparted and from it to the carrying-disk $A'$, the intermittent motion being imparted to said wheel by any of the well-known binder-mechanism gears now in general use, or in any other preferred way. The disk or plate $A'$ carries at one side an arm or bracket A, in which the band-forming devices hereinafter described are mounted, and upon the opposite side a weight $A^4$, to counterbalance and regulate the movement of the binding devices. In suitable bearings in the disk or plate $A'$ are supported shafts $B^4\,B^6$, which are also supported at their inner ends in bearings formed in the arm A, and upon the ends of these shafts, and meshing with the enlarged gear-wheel $B'$, are mounted pinions $B^2\,B^3$, and through which pinions motion is communicated to the various parts of the band gathering and forming devices.

The arm or bracket A is made in substantially the form shown in Fig. 9, having bearings formed therein for the shafts hereinafter referred to, which arm extends from near the outer edge of the disk inward for a short distance at right angles to the face of the disk, where it is bent inward at an angle to bring the band-forming devices into proper position to act on the center of the bundle, and has bolted or otherwise secured to its outer end a hook-casting G, in which hook-casting G is also formed a part of the bearings for the operating-shafts.

The shaft $B^4$ has formed at its inner end one part of a universal coupling $B^5$, the other part of which coupling is formed on the end of a conical double-threaded worm C, the opposite end of the worm adjacent to the bundle being carried and supported in a socket formed in a gathering-hook casting G, hereinbefore referred to, at the outer end of the arm A and curving up therefrom, as shown in Fig. 5.

The webs $C'$ of the worm C are formed with a backwardly-projecting rib at their periphery, as shown in Fig. 6, for a purpose hereinafter explained.

The shaft $B^6$ carries at its inner end a bevel-pinion $B^7$, which meshes with a similar pinion $B^8$, mounted on a short shaft or spindle $B^9$, mounted in bearings in the arm A, and upon the spindle $B^9$ is also mounted a sprocket-wheel D, which supports and gives motion to an endless pitch-chain $D'$, the other end of which chain passes around and is supported on a sprocket-wheel $D^2$, keyed on a short spindle $D^3$, mounted in bearings in the hook-casting G near the end of the worm C. The worm C is preferably made in tapering form from its heel to the point where it engages the straw, and is revolved in the direction indicated by the arrow to cause the straw to be twisted into the spiral groove toward the heel end thereof. The chain $D'$ is moved in a direction, as indicated by the arrow, so as to cause it to carry the straws backward into the grooves of the worm. Projecting from the chain $D'$ and arranged at equal intervals are pins $D^4$, so pitched and disposed in relation to the worm that one of them is just beside the back edge of each of the webs $C'$, and are between each adjoining web, and their gearing is so timed that they always maintain this position while the binding devices are at work.

The spindle $D^3$, above referred to, has mounted on the opposite end to the sprocket-wheel $D^2$, a bevel-pinion E, which meshes with a bevel-pinion $E'$, mounted on a shaft or spindle $E^2$ and extending outward parallel with and about in line with the shaft $B^6$, having its bearings in the hook-casting G. This shaft carries on its opposite or outer end a crank-disk $E^3$, the wrist-pin of which has connected to it a rod or pitman $E^4$, which pitman is in turn connected with a crank-arm $E^5$ on a shaft or spindle $E^6$, supported in a bracket or bearing $A^5$, formed with or depending from the hook-casting G. The shaft $E^6$ has also mounted upon it an oscillating finger $E^7$, which movement is communicated thereto by the oscillation of the shaft $E^6$, through the crank and pitman above referred to, and the point of which finger moves to and from the gathering-point $G'$, which engages and draws the straws from the bundle, when the finger $E^7$ in its reciprocation will engage and force the same into the path of the end of the worm, the straws being drawn from about centrally of the bundle from the stubble end and then twisted toward said stubble end by the action of the worm. A short hook $G'$ curves from the casting G and in such manner as to take the straw or stalks to form the bundle, and the finger, traveling in its movement under the hook, serves to feed the straws or stalks under the end of the hook and into the path of the web or worm C and into position to be engaged and acted on thereby.

$G^6$ is a sliding plate mounted in suitable bearings in the hook-casting G and made adjustable to or from the end of the hook $G'$, a depending lug fitting and moving in a recess in the casting G being engaged by a thumb-screw $G^7$, mounted in the casting G. The object of this plate and its adjustment to or from the end of the hook is to increase or diminish the opening between its end and the front of the hook to regulate the amount of straw taken by the hook to form the band.

$G^8$ is a guide-plate attached to the casting G, and which plate is provided with a projecting finger $G^9$ to lead the straw to the hook $G'$.

The endless chain or rake is covered by means of a plate $A^6$, which covers the chain and protects it from the straws or from being clogged by the same coming in contact therewith, and which cover may be constructed in any preferred way.

As before stated, parts of the machine not herein particularly described may be constructed in any usual or preferred ways.

The operation is as follows: The sheaf is delivered to the clamping or holding device H in any usual or preferred way and held stationary thereby. The sprocket-wheel $A^3$ is then set in motion to make one revolution, and which imparts motion to the disk or plate $A'$, through it to the arm A, causing said arm to travel around the bundle. In this movement motion is communicated to the pinions $B^2 B^3$, which are of such size in relation to the main or enlarged wheel B as to have a high rate of speed communicated thereto and thus to the band-forming devices. In the movement of the arm A around the bundle the hook $G'$ gathers a small part of the outer straw or stalks, when the reciprocating finger $E^7$ engages and forces them inward into the space between the web $C'$ at the end of the conical worm C, which by its revolving movement twists or spins the straw into a band. The endless rake, acting on the ends of the straw or stalks, leads the same within the web $C'$ of the worm and insures all the straws or stalks gathered by the hook being taken and twisted without the ends straggling or standing out, the adjustment of the plate $G^6$ to or from the point of the hook G' regulating the amount of straw or stalks taken by said hook, and the finger G⁹ on the plate G⁸ serving to assist in leading the straws or stalks to the hook G'. When the arm has made a complete revolution, the band will have been formed quite around the bundle, when the free end may be tucked under the other part in any usual or preferred way, and as the tucker forms no part of the process or art herein set forth it is not shown nor described. The weight A⁴, as before stated, counterbalances the weight of the arm A' and causes the same to come to a stop after the sprocket-wheel A³ has completed its revolution.

Having now described one means for carrying out my improved art or process, what I claim is—

1. A device for binding grain, consisting of means for holding the bundle stationary, in combination with distinct drawing, feeding, and twisting devices which draw the straw butts in a continuous stream from the periphery of the bundle, feed the same to be twisted, and twist them into a band while traveling around the bundle actuated by suitable mechanism, substantially as specified.

2. In a binder, an arm adapted to travel around the bundle, a conical spinning-worm, and means for feeding the straw to the worm carried by the arm, substantially as and for the purpose set forth.

3. In a binder, a clamp for holding the bundle stationary, an arm mounted and adapted to travel around the bundle, a conical spinning-worm mounted in said arm, and means, substantially as described, for feeding the straw from the bundle to the worm, as set forth.

4. In a binder, the combination of a gathering-hook, a conical spinning-worm, and a traveling rake or comb mounted upon and carried by a traveling arm around the bundle to form the band, substantially as set forth.

5. In a binder, a hook to gather the straws from points on the periphery of the bundle, a reciprocating finger, and a worm to twist or spin the gathered straws into a band, substantially as and for the purpose set forth.

6. In a binder, a worm to spin or twist the straw into a band having a web at the end thereof, a hook to gather the straw from points on the periphery of the bundle to form the band, and a reciprocating finger to force the straws into the path of and to be acted on by the worm, substantially as set forth.

7. In a binder, a worm to spin or twist the straw into a band, a hook to gather the straw from points on the periphery of the bundle, a reciprocating finger, and means, substantially as described, for regulating the amount of straw gathered from the bundle to form the band, for the purpose set forth.

JAMES GEORGE MARTIN.

Witnesses:
 WALTER SMYTHE BAYSTON,
 EDWARD WATERS.